United States Patent [19]

Okamoto et al.

[11] 4,358,937
[45] Nov. 16, 1982

[54] DEVICE FOR CONDUCTING COOLING LIQUID IN AND OUT OF LIQUID COOLED ROTOR TYPE ROTARY ELECTRIC MACHINE

[75] Inventors: Kouichi Okamoto, Kobe; Masaki Sakuyama, Ashiya; Shoji Furukado; Norio Oishi, both of Kobe, all of Japan

[73] Assignee: Mitsubishi Denki Kabushiki Kaisha, Tokyo, Japan

[21] Appl. No.: 211,994

[22] Filed: Dec. 1, 1980

[51] Int. Cl.³ .............................................. F25B 31/00
[52] U.S. Cl. ............................................ 62/505; 277/3; 277/15; 310/54; 310/61
[58] Field of Search .................... 62/55, 505; 310/61, 310/54; 277/3, 15

[56] References Cited

U.S. PATENT DOCUMENTS

| | | | |
|---|---|---|---|
| 3,733,501 | 5/1973 | Heller et al. | 310/54 |
| 3,831,046 | 8/1974 | Curtis et al. | 310/54 |
| 3,835,919 | 9/1974 | Lamerecht et al. | 310/54 |
| 3,922,573 | 11/1975 | Pluschke | 310/54 |
| 4,114,058 | 9/1978 | Albaric | 310/54 |
| 4,114,059 | 9/1978 | Albaric et al. | 310/54 |

FOREIGN PATENT DOCUMENTS 1368045 9/1974 United Kingdom .
48-48905 7/1973 Japan .

*Primary Examiner*—Ronald C. Capossela
*Attorney, Agent, or Firm*—Sughrue, Mion, Zinn, Macpeak & Seas

[57] ABSTRACT

A device for conducting cooling liquid in and out of liquid cooled rotor type machine such as an electric turbine generator. A discharging ring having small holes formed therein is disposed so as to cover an open end of an outflow pipe for cooling liquid from the rotor shaft. A first outlet chamber surrounds the open end of the outflow pipe to receive cooling liquid discharged through the discharging ring. A second outlet chamber having one end side integral with the first outlet chamber receives cooling liquid discharged through a seal between the first outlet chamber and the outflow pipe. Shielding gas is supplied into the first outlet chamber to maintain the pressure therein higher than atmospheric pressure. The first outlet chamber is only partially filled with cooling liquid.

7 Claims, 4 Drawing Figures

4,358,937

DEVICE FOR CONDUCTING COOLING LIQUID IN AND OUT OF LIQUID COOLED ROTOR TYPE ROTARY ELECTRIC MACHINE

BACKGROUND OF THE INVENTION

1. Field of the Invention

The present invention relates to liquid cooled rotor type rotary electric machines in which a cooling liquid is circulated in the rotor to cool the rotor. More particularly, the invention relates to a device for conducting the cooling liquid in and out of such a machine.

2. Description of the Prior Art

As is well known in the art, any increase of the capacity of a rotary electric machine depends on the ability to suppress increases in the temperature thereof, that is, how to effectively cool the machine. In other words, the maximum permissible capacity of a rotary electric machine is determined by its maximum temperature and hence its ability to dissipate heat. On the other hand, there have been strong demands for increased capacity of rotary electric machines including electric generators and especially turbine generators in order to improve the efficiency of power plants. For this purpose, a cooling technique of circulating hydrogen gas for cooling a turbine generator has been employed thus increasing the capacity thereof. However, this technique appears to have met its limit for increased capacity. Accordingly, it is necessary to provide another suitable cooling technique.

In order to meet this requirement, a technique has been proposed in which, instead of hydrogen gas, a cooling fluid such as water which is high in cooling efficiency is employed as the cooling medium. According to this technique, a cooling liquid is circulated in the stator to cool the latter. If this technique could be developed satisfactorily to cause the cooling liquid to circulate not only in the stator but also in the rotor, then the cooling effect would be greatly improved.

For instance, in the case of a turbine generator, its rotor rotates at a high speed of 3600 rpm. (60 Hz). Therefore, the forcing of the cooling liquid through the desired paths in high-speed rotating element is a problem the solution of which is considerably difficult. This difficult problem has retarded the commercialization of liquid cooled rotor type rotary electric machines.

FIG. 1 shows a device for directing the flow of cooling liquid in a liquid cooled rotor to which the technical concept of the invention is applicable. In FIG. 1, reference numeral 1 designates an inlet pipe through which a cooling liquid such as pure water is supplied with the aid of a supply pump (not shown), 2 a cylindrical liquid inflow pipe for receiving the cooling liquid from the inlet pipe 1 through an opening 2a with the hollow interior 2b forming the inflow path of the cooling liquid, and 3 a liquid outflow pipe placed over the inflow pipe 2 with a gap 3b providing a predetermined clearance therebetween. Pure water is preferred so as to not corrode any of the pipes with impurities. The gap 3b is utilized as the outflow path of the cooling liquid. The outflow pipe 3 has an opening 3a through which the cooling liquid is discharged. The outflow pipe 3 and the inflow pipe 2 are connected together to form a cooling liquid supplying and draining pipe 4 as shown in FIG. 2. As is apparent from FIG. 2, the inflow pipe 2 has a plurality of (six in the case of FIG. 2) protruding pieces 2c extending from the outer wall of the pipe 2. The protruding pieces 2c serve as spacers which couple the inflow pipe 2 and the outflow pipe 3 together and reinforce the pipes 2 and 3. The inflow pipe 2 with the protruding pieces 2c is made integral with the outflow pipe 3, for instance, by shrink fitting, to form the supplying and draining pipe 4. The pipe 4 has a flange 4a at its end which is coupled to the flange 5a of the shaft of the rotor of a rotary electric machine with bolts or the like (not shown). The rotor coil (not shown) is mounted on the shaft 5. As is clear from FIG. 1, an inflow path 5b and an outflow path 5c are formed in the rotor shaft 5 and are communicated with the inflow path 2b and the outflow path 3b in the supplying and draining pipe 4, respectively, so that the cooling liquid supplied through the inflow path 5b, after circulating in the rotor coil, is discharged into the outflow path 5c. In FIG. 1, the arrows indicate the flow of the cooling liquid. As described above, the cooling liquid, after cooling the rotor coil by circulating therein, is drained from the opening 3a of the outflow pipe 3 through the outflow paths 5c and 3b.

The device has a first outlet chamber 61 for receiving the liquid discharged from the opening 3a. The chamber 61 is so designed that it is always filled with the cooling liquid in order to prevent contamination of the cooling liquid (pure water) which might occur if the liquid were to be brought into contact with the atmosphere. The first outlet chamber 61 has a first outlet pipe 71 for conducting the cooling liquid out of the chamber 61. The cooling liquid discharged from the first outlet pipe 71 is not brought into contact with atmospheric air, that is, it is prevented from being contaminated, and therefore it can be resupplied to the inlet pipe 1 through a supply pump (not shown) after its temperature is decreased by a heat exchanger or the like (not shown). That is, the water can be recirculated.

In FIG. 1, reference numeral 81 designates a first labyrinth seal for preventing the leakage of cooling water from the inlet pipe 1 into the first outlet chamber 61. It is impossible to completely eliminate the leakage of liquid between a stationary part and a rotary part, but it is necessary to make maximum efforts to prevent the leakage of liquid. The liquid leaked into the chamber 61 will cause no serious difficulty because it is recirculated through the outlet pipe 71. However, it goes without saying that the amount of leaked liquid should be as small as possible because, if it is excessively large, the efficiency of the device is decreased.

A second labyrinth seal 82 is provided to prevent the leakage of liquid between the first outlet chamber 61 and the rotating pipe 4. A second outlet chamber 62 is provided for receiving the liquid which leaks through the second labyrinth seal 82 from the first outlet chamber 61. In the second outlet chamber 62, unlike the first outlet chamber 61, the cooling liquid is not fully filled therein and therefore the cooling liquid may be contaminated by contacting the air. In order to prevent this, a gas supplying pipe 9 is provided. Shielding gas such as nitrogen or hydrogen is supplied into the second outlet chamber 62 through the gas supplying pipe 9 at all times so that the pressure in the second outlet chamber 62 is maintained slightly higher than the ambient atmospheric pressure thereby preventing the entry of air into the second outlet chamber 62. Thus, the liquid leaked into the second outlet chamber 62 is not brought into contact with atmospheric air and accordingly not contaminated. Therefore, the cooling liquid discharged from the second outlet pipe 72 of the chamber 62 cab be recirculated through a heat exchanger and a supply pump (none of which are shown) as in the case of the cooling liquid discharged from the first outlet chamber 61.

Further in FIG. 1, reference numeral 83 designates a third labyrinth seal for preventing the leakage of liquid between the second outlet chamber 62 and the rotating pipe 4, 63 a third outlet chamber for receiving the liquid which leaks from the second outlet chamber 63 through the third labyrinth seal, and 73 a third outlet pipe which communicates with the third outlet chamber. The amount of cooling liquid entering the third outlet chamber is very small because of the presence of the two labyrinth seals 82 and 83. Therefore, the cooling liquid in the third outlet chamber 63 is not shielded from the air. Accordingly the cooling liquid conducted from the third outlet chamber through the third outlet pipe 73 must be disposed of without being recirculated. Of course, if it is purified by a water purifying device, it can be circulated again.

The rotor shaft 5 is supported by bearings (not shown) while it is impossible to provide bearings for the supplying and draining pipe 4 because of the presence of the outlet chambers. Accordingly, the pipe 4 must be supported hanging over the rotor shaft 5. As a result, the pipe 4 tends to undergo lateral vibration continuously. This lateral vibration is undesirable because it disturbs the sealing effect. As the length of the pipe 4 is increased, the lateral vibration of the pipe increases. Accordingly, it is desirable that the pipe 4 be as short as possible. However, the above-described device has three outlet chambers and therefore the pipe 4 must be long enough to cover the three chambers which increases the lateral vibration of the pipe 4. Furthermore, in the above-described device, the first outlet chamber 61 is maintained filled with cooling liquid. Therefore, the device is disadvantageous in that the casing of the outlet chamber 61 must be completely sealed and the power loss is relatively large because of the friction between the pipe 4 and the cooling liquid filled in the chamber.

These difficulties may be eliminated by providing two outlet chambers as shown in FIG. 3 and by maintaining the two chambers not filled with the cooling liquid. In FIG. 3, reference numeral 612 designates an outlet chamber which is provided by combining the outlet chambers 61 and 62 in FIG. 1 into one chamber and 712 an outlet pipe communicating with the outlet chamber 612. The remaining arrangement is the same as that of FIG. 1. In the arrangement of FIG. 3, the outlet chamber 612 is not fully filled with cooling liquid and instead a shielding gas such as nitrogen or hydrogen is supplied through a gas supplying pipe 9 into the outlet chamber 612 to prevent the cooling liquid in the outlet chamber 612 from coming into contact with the atmospheric air. The pressure in the outlet chamber 612 is maintained higher than atmospheric pressure to prevent the entrance of air thereinto. That is, the outlet chamber 612 is formed by constructing the two outlet chambers 61 and 62 as a single unit and the cooling liquid conducted through the outlet pipe 712 is recirculated as in the case of FIG. 1. With the device shown in FIG. 3, the above-described difficulties are substantially eliminated but the device still has a serious problem, namely, cavitation. As the pressure in the outlet chamber 612 is lower than the pressure which is provided when the chamber is filled with the cooling liquid, the cooling liquid received by the outlet chamber 612 from the opening 3a of the outflow pipe 4 is freely discharged as a result of which cavitation occurs in the outflow paths 3b and 5c and in the cooling pipe of the rotor coil (not shown) thus corroding such parts. The reason why the outlet chamber 61 (FIG. 1) for receiving the cooling liquid discharged from the outflow pipe 3 is filled with the cooling liquid is to prevent the occurrence of cavitation. Thus, heretofore it was considered essential to fill the outlet chamber with cooling liquid and it was thought that the above-described difficulty could not be avoided.

SUMMARY OF THE INVENTION

According to the invention, a cooling liquid conducting device is so designed that its first outlet chamber is not fully filled with the cooling liquid, unlike a conventional device. As a result, the device of the invention has only two outlet chambers. The length of the cooling liquid supplying and draining pipe is reduced as much which eliminates the trouble that the pipe undergoes lateral vibration.

Since the outlet chamber is not fully filled with the cooling liquid, it is unnecessary to positively seal the casing of the outlet chamber. The above-described power loss due to friction between the cooling liquid and the cooling liquid supplying and draining pipe is also eliminated.

Furthermore, according to the invention, the cooling liquid from the outflow pipe is discharged into the outlet chamber through small holes which are cut in a discharging ring which is provided, according to the invention, so that resistance against the discharge of the cooling liquid is increased thereby solving the above-described problem of cavitation.

DESCRIPTION OF THE PREFERRED EMBODIMENTS

Figure 3:
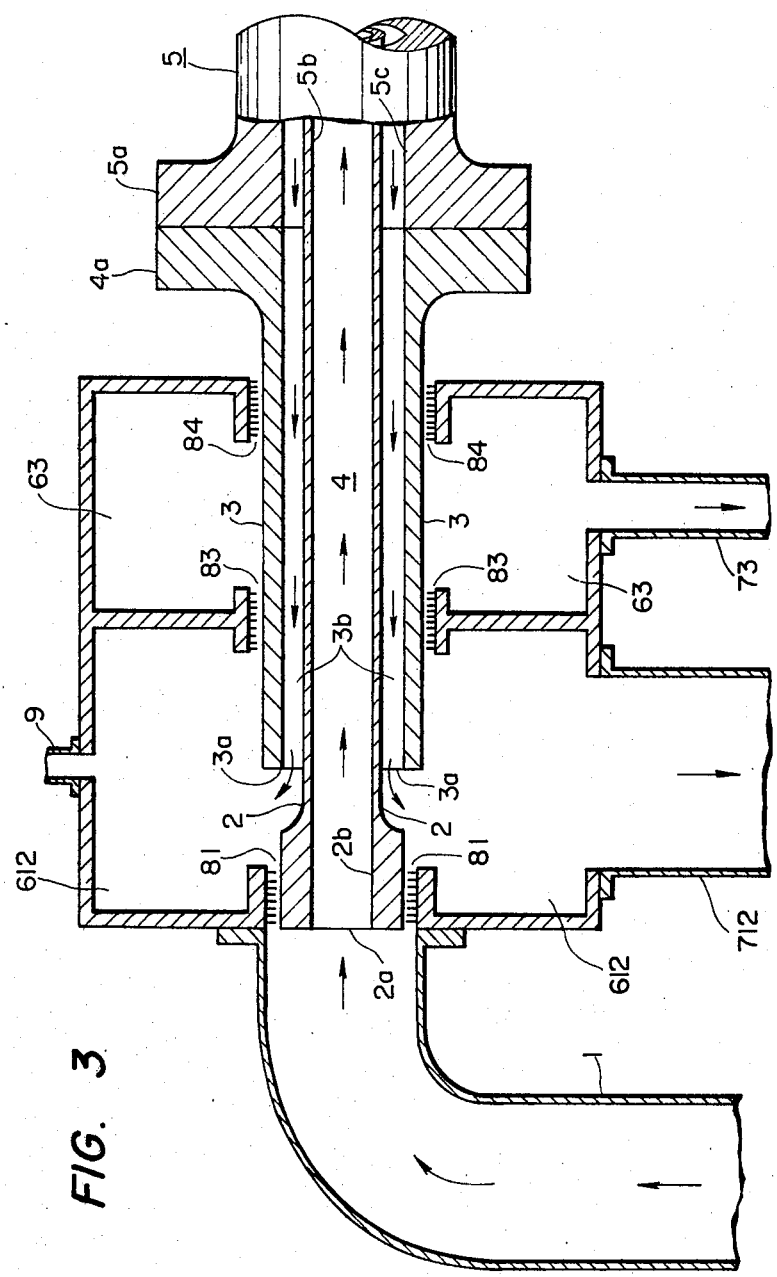
FIG. 3 is a longitudinal sectional view showing a proposed prior art cooling liquid conducting device.
Figure 4:
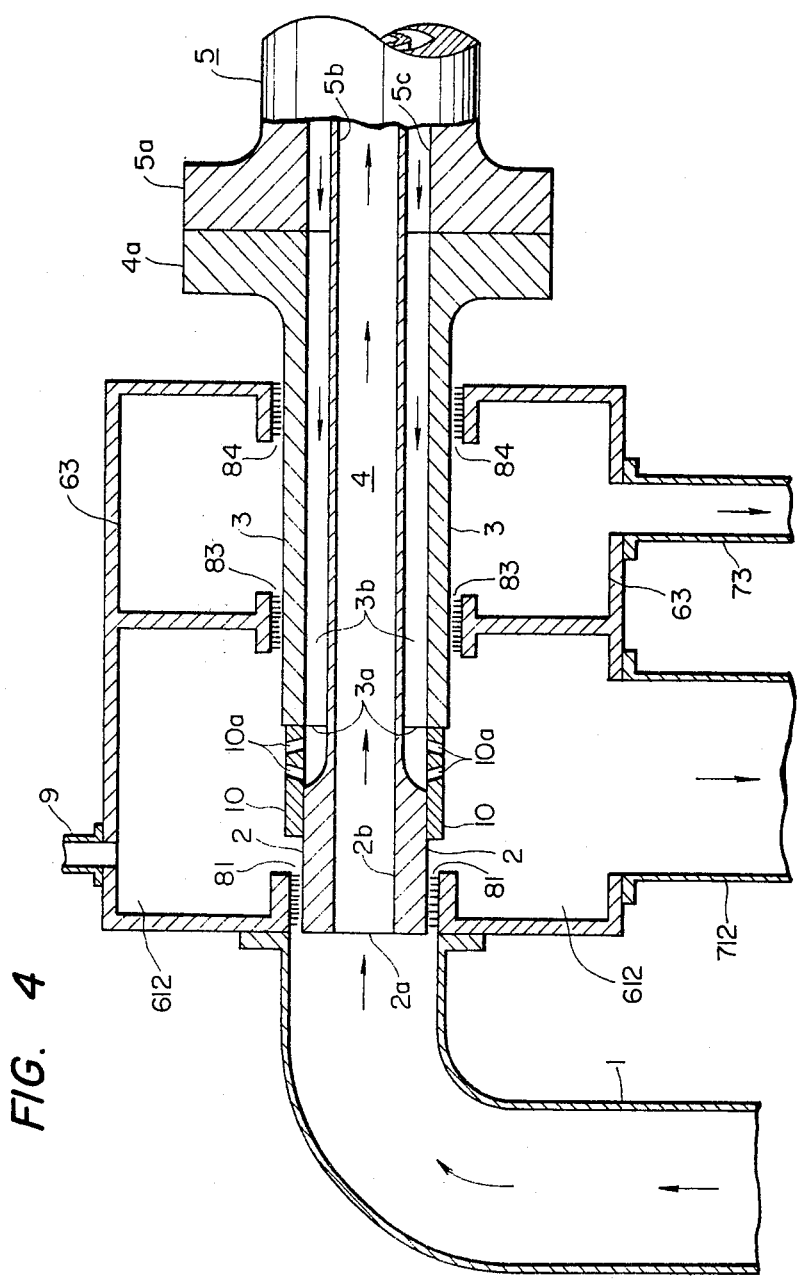
FIG. 4 is also a longitudinal sectional view showing a preferred embodiment of a cooling liquid conducting device constructed according to the invention.

A preferred embodiment of a device for conducting a cooling liquid in two directions according to the invention, as shown in FIG. 4, is provided with a discharging ring 10 having small holes 10a. The remaining arrangement is the same as that of FIG. 3.

Figures 1, 2:
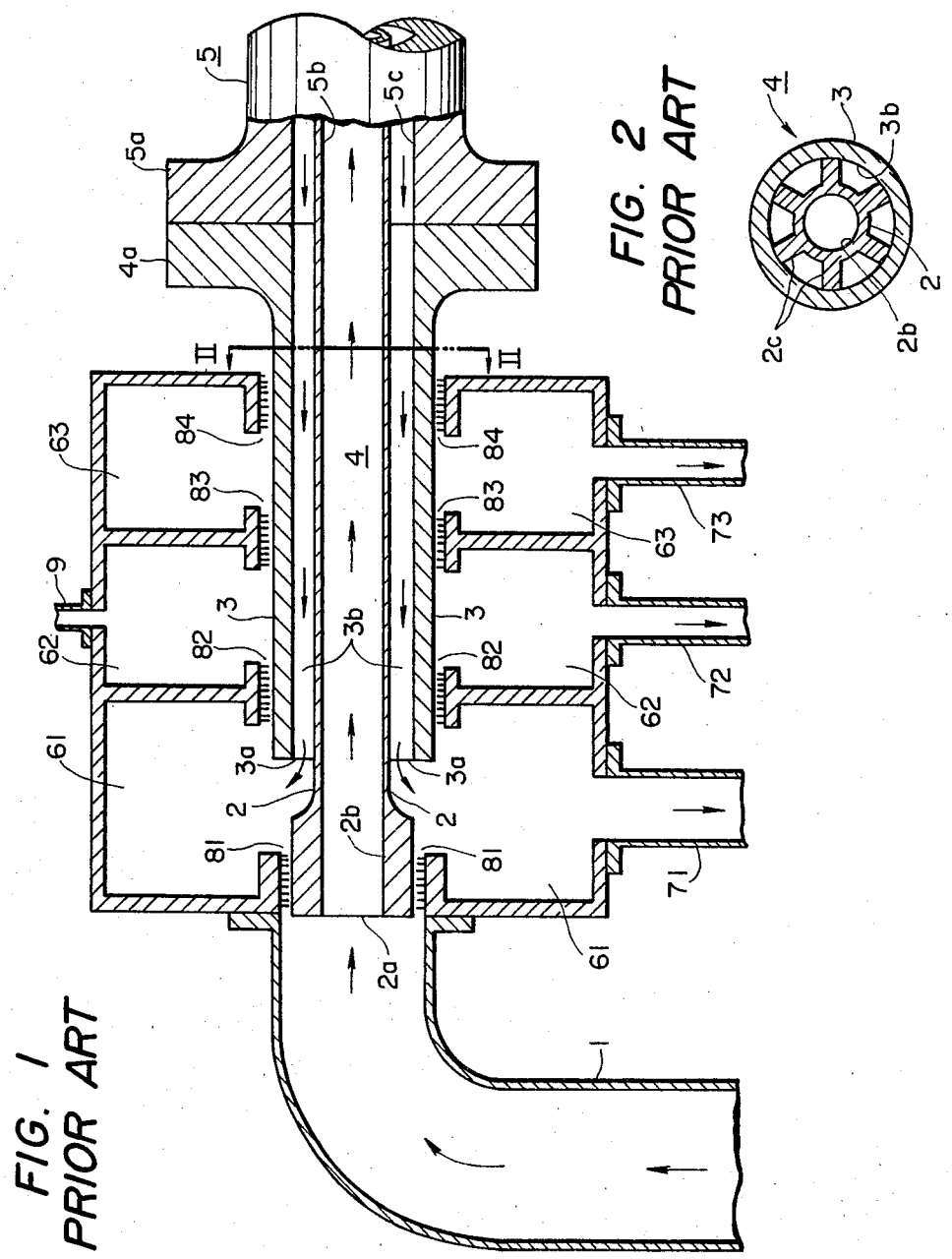
FIG. 1 is a longitudinal sectional view showing a conventional cooling liquid conducting device.
FIG. 2 is a sectional view taken along line II—II in FIG. 1.

The discharging ring 10 is fixedly mounted on the inflow pipe 2, by fitting for instance, in such a manner that the small holes 10a communicate with the opening 3a of the outflow pipe 3. Accordingly, the cooling liquid from the outflow pipe 3 is conducted into the outlet chamber 612 through the small holes 10a. That is, the discharging ring 10 performs an orifice action in discharging the cooling liquid thus positively preventing the occurrence of cavitation, which is a serious problem of the device shown in FIG. 3. Since the problem of cavitation is thus solved, it is unnecessary to maintain the outlet chamber 612 filled with cooling liquid. As a result, the number of outlet chambers can be reduced to two and the length of the cooling liquid supplying and draining pipe 4 can be made shorter than that of the pipe 4 in FIG. 1. As a result, dangerous lateral vibration of the pipe 4 is significantly reduced. Since it is unnecessary to maintain the outlet chamber 612 filled with cooling liquid as in the prior art structure, the casing of the outlet chamber can be readily sealed and the power loss due to friction between the pipe 4 and the cooling liquid is eliminated.

In the above-described embodiment, the small holes 10a of the ring 10 are arranged in two lines in the circumferential direction. However, the number of lines may be one or three or more. Furthermore in the embodiment described, the small holes 10a are inclined in opposite directions from one another so that the cooling liquid flows discharged through the small holes 10a strike against one another and are thereby scattered preventing wearing away of the casing of the outlet chamber 612 which otherwise could result from the striking of the cooling liquid flows against the casing. If such wearing is not involved in a particular application of the invention, then it is unnecessary to incline the small holes.

In the above-described embodiment, the discharging ring is fixedly mounted on the inflow pipe 2 by shrink fitting. However, it may be mounted between thereon by other techniques or it may be mounted on the outflow pipe 4. Furthermore, in the above-described embodiment, the discharging ring 10 and the outflow pipe 3 are separately provided. However, they may be formed as a single unit.

In the above-described embodiment, pure water is employed as the cooling liquid although any liquid which does not corrode the various pipes and the rotor coil can be used.

While the invention has been described with reference to an electric generator, especially a turbine generator, the invention can be applied to other types of electric generators such as water-wheel generators and to a variety of rotary electric machines such as electric motors.

In the above-described embodiment, labyrinth seals are used to prevent the leakage of cooling liquid although other types of seals such as mechanical seals can be used for the same purpose.

What is claimed is:

1. A device for conducting cooling liquid in and out of a liquid cooled rotor type machine comprising:
   an inlet pipe for conducting in a cooling liquid;
   a cylindrical inflow pipe having one end coupled to a rotor shaft of said machine with the other end open for introducing said cooling liquid from said inlet pipe;
   a cylindrical outflow pipe coaxially disposed around said inflow pipe with a gap of predetermined length therebetween, said outflow pipe having one end connected to said rotor shaft, said gap conducting out cooling liquid, the other end of said outflow pipe being open;
   a discharging ring having small holes formed therein, said discharging ring being disposed to cover said open end of said outflow pipe;
   a first outlet chamber surrounding said open end of said outflow pipe including said discharging ring for receiving cooling liquid discharged through said discharging ring;
   a first outlet pipe for conducting said cooling liquid out of said first outlet chamber;
   a first seal for preventing the passage of cooling liquid between one side of said first outlet chamber and said inflow pipe;
   a second seal for preventing the passage of cooling liquid between the opposite side of said first outlet chamber and said outflow pipe;
   a second outlet chamber having one side integral with said first outlet chamber for receiving cooling liquid which passes through said second seal;
   a second outlet pipe for conducting cooling liquid out of said second outlet chamber;
   a third seal for preventing the passage of cooling liquid between the opposite side of said second outlet chamber and said outflow pipe; and
   a gas supplying pipe for supplying a shielding gas into said first outlet chamber and maintaining the pressure in said first outlet chamber higher than atmospheric pressure,
   said first outlet chamber being only partially filled with cooling liquid.

2. The device as claimed in claim 1 in which said shielding gas is nitrogen gas.

3. The device as claimed in claim 1 in which said rotary machine is an electric turbine generator.

4. The device as claimed in claim 1 wherein said discharging ring is fixedly mounted on said inflow pipe.

5. The device as claimed in claim 1 wherein said discharging ring is fixedly mounted on said outflow pipe.

6. The device as claimed in claim 1 wherein said small holes are arranged in two lines in the circumferential direction of said inflow and outflow pipes.

7. The device as claimed in claim 6 wherein said small holes in each of said two lines are inclined in opposite directions from one another so as to direct cooling liquid flows to strike against one another.

* * * * *